Nov. 2, 1948.  C. R. KENNY  2,452,575
AUTOMATIC FREQUENCY CONTROL
Filed April 22, 1943　　　　　　　　　　　　　　　5 Sheets-Sheet 1

INVENTOR
CHARLES R. KENNY
BY Paul B. Hunter
ATTORNEY

INVENTOR
CHARLES R. KENNY
BY
Paul B. Hunter
ATTORNEY

Nov. 2, 1948.    C. R. KENNY    2,452,575
AUTOMATIC FREQUENCY CONTROL
Filed April 22, 1943    5 Sheets-Sheet 4

INVENTOR
CHARLES R. KENNY
BY Paul B. Hunter
ATTORNEY

Nov. 2, 1948. C. R. KENNY 2,452,575
AUTOMATIC FREQUENCY CONTROL
Filed April 22, 1943 5 Sheets-Sheet 5

INVENTOR
CHARLES R. KENNY
BY Paul B. Hunter
ATTORNEY

Patented Nov. 2, 1948

2,452,575

UNITED STATES PATENT OFFICE 2,452,575

AUTOMATIC FREQUENCY CONTROL

Charles R. Kenny, Crestwood, N. Y., assignor to The Sperry Corporation, a corporation of Delaware Application April 22, 1943, Serial No. 484,103

29 Claims. (Cl. 250—36)

My invention relates to ultra high frequency control systems and is particularly concerned with automatic frequency control apparatus and methods for such systems.

In its illustrative embodiment, the invention will be described as employed for obtaining and maintaining constant output frequency during operation of an ultra high frequency oscillator of the type wherein an electron beam is passed through interacting hollow resonator means, but may be used generally with any type of tunable oscillator.

Considerable difficulty has been experienced in attempting accurate frequency control of hollow resonator type ultra high frequency devices, especially where the device is to be used for delivering any appreciable amount of power. Such devices normally require a long warming up period, usually measured in hours, during which the output frequency varies considerably before reaching a condition of temperature stabilization where a relatively constant output frequency may be expected. Moreover, such devices are very sensitive to drafts, changes in external air temperature, mechanical vibrations and the like which may unexpectedly alter their output frequency during operation.

Satisfactory frequency control of relatively low power ultra high frequency sources has been accomplished by employing a system consisting of a crystal controlled oscillator coupled to a frequency multiplier chain. But where appreciable power is needed along with frequency control, these crystal stabilized oscillators cannot be directly employed. My invention is especially adapted for accurate frequency control of relatively high power ultra high frequency sources.

It is a major object of the invention to provide novel automatic frequency control methods and apparatus for speedily obtaining and reliably maintaining a desired output frequency from an ultra high frequency source, or a desired frequency difference between two ultra high frequency sources. The invention is especially adapted for controlling high power in high frequency sources of the hollow resonator type.

A further object of the invention is to provide automatic frequency control methods and apparatus embodying novel frequency band-sweeping or scanning arrangements.

A further object of the invention is to provide automatic frequency control methods and apparatus embodying novel associated phase discriminator and frequency band scanning arrangements for detecting and utilizing frequency control signals.

A further object of the invention is to provide novel apparatus for repeatedly tuning a hollow resonator type ultra high frequency device over an appreciable frequency range.

A further object of the invention is to provide novel arrangements for controlling the operation of a frequency scanning system in automatic frequency control apparatus.

A further object of the invention is to provide automatic frequency control apparatus embodying novel thermally responsive tuning and tuning range scanning arrangements.

A further object of the invention is to provide novel electromagnetic tuning range scanning arrangements.

A further object of the invention is to provide novel direct current energized viscous damping or braking arrangements for an electric motor or the like.

It is a further object of the invention to provide novel automatic volume regulation or control arrangements, especially adapted for automatic frequency control systems but not restricted thereto.

Further objects of the invention will presently appear as the description proceeds in connection with the appended claims and the annexed drawings, wherein:

Fig. 6 is a fragmentary wiring diagram illustrating an alternative manner of connecting the output of the control circuit power amplifier to the tuning motor;

Figure 1:
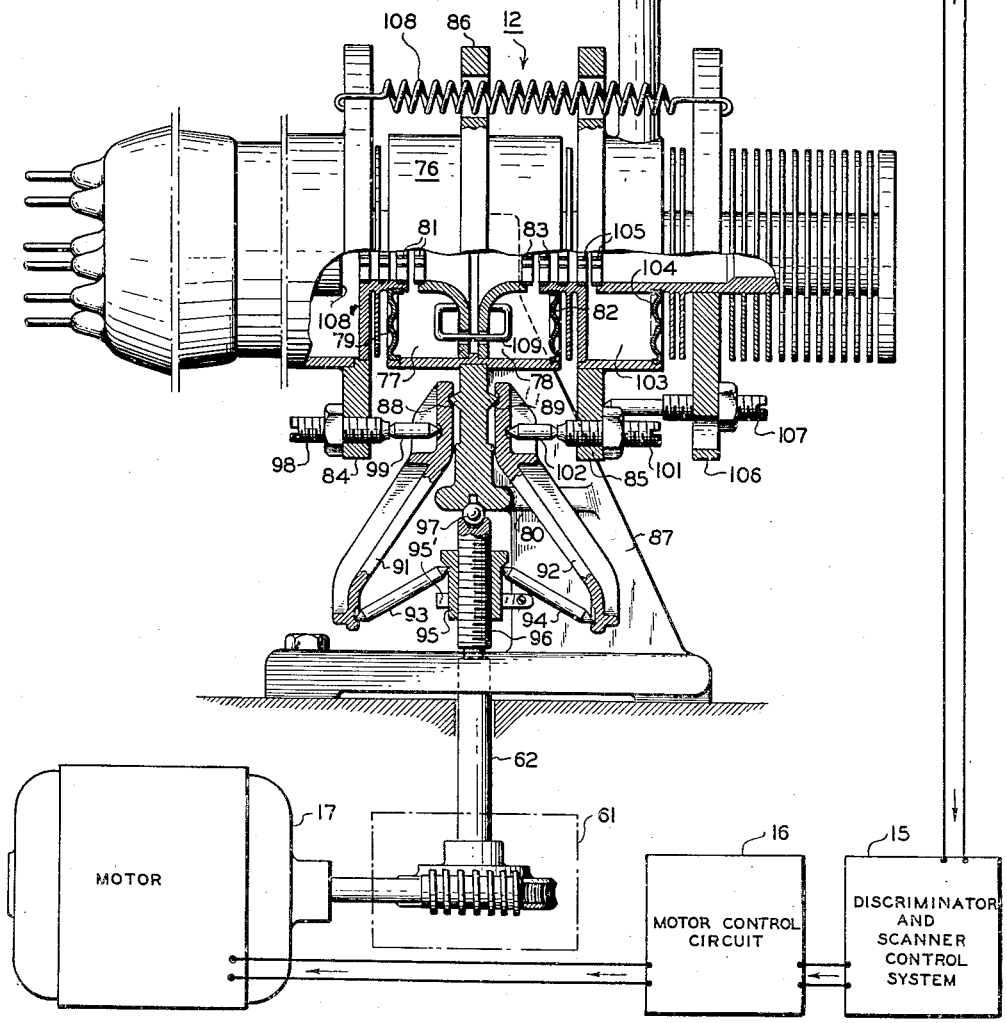
Fig. 1 is a partly diagrammatic and partly sectional detail view illustrating a preferred embodiment of the invention.

Referring to Fig. 1, which illustrates a preferred manner of practicing the invention and details of a practical mechanical automatic tuning device for a source to be controlled as to frequency, ultra high frequency energy from a crystal stabilized oscillator system 11 and a controllable oscillator 12 is mixed in a suitable mixer 13. The output of mixer 13 is an alternating voltage, the frequency of which is the difference between the ultra high frequency outputs of oscillators 11 and 12. This difference frequency output of mixer 13 is of sufficiently low frequency that it may readily be handled in a conventional amplifier 14 and utilized in a phase sensitive discriminator and scanning control system 15, later to be described in detail, for actuating motor control circuit 16 to drive tuning motor 17 of oscillator 12 to maintain the output frequency of oscillator 12 at a desired value.

The system of the invention will be described as employed to maintain the output of oscillator 12 at constant frequency.

Crystal stabilized oscillator system 11 is of the above described low power type, preferably comprising a crystal controlled oscillator whose output frequency is appreciably below ultra high frequency ranges, but employing a frequency multiplier arrangement for producing an output from system 11 which is of a frequency very near that of oscillator 12. Since specific details of this system are not part of the present invention, further description thereof is not necessary, as any equivalent relatively low power system for obtaining a constant ultra high frequency near that desired for oscillator 12 may be employed.

Oscillator 12, as illustrated, is preferably of the hollow resonator type having output frequencies in the range of $3 \times 10^9$ cycles per second or higher, and capable of delivering appreciable power output. Details of this device will be later described.

Mixer 13 is of any suitable type for receiving the two ultra high frequency source outputs and delivering to amplifier 14 a voltage having a beat frequency equal to the difference between the frequencies of system 11 and oscillator 12. This frequency difference will be hereinafter known as the difference or beat frequency. Since details of mixer 13 and amplifier 14 do not comprise part of the present invention, further description thereof is not necessary.

Figure 2:
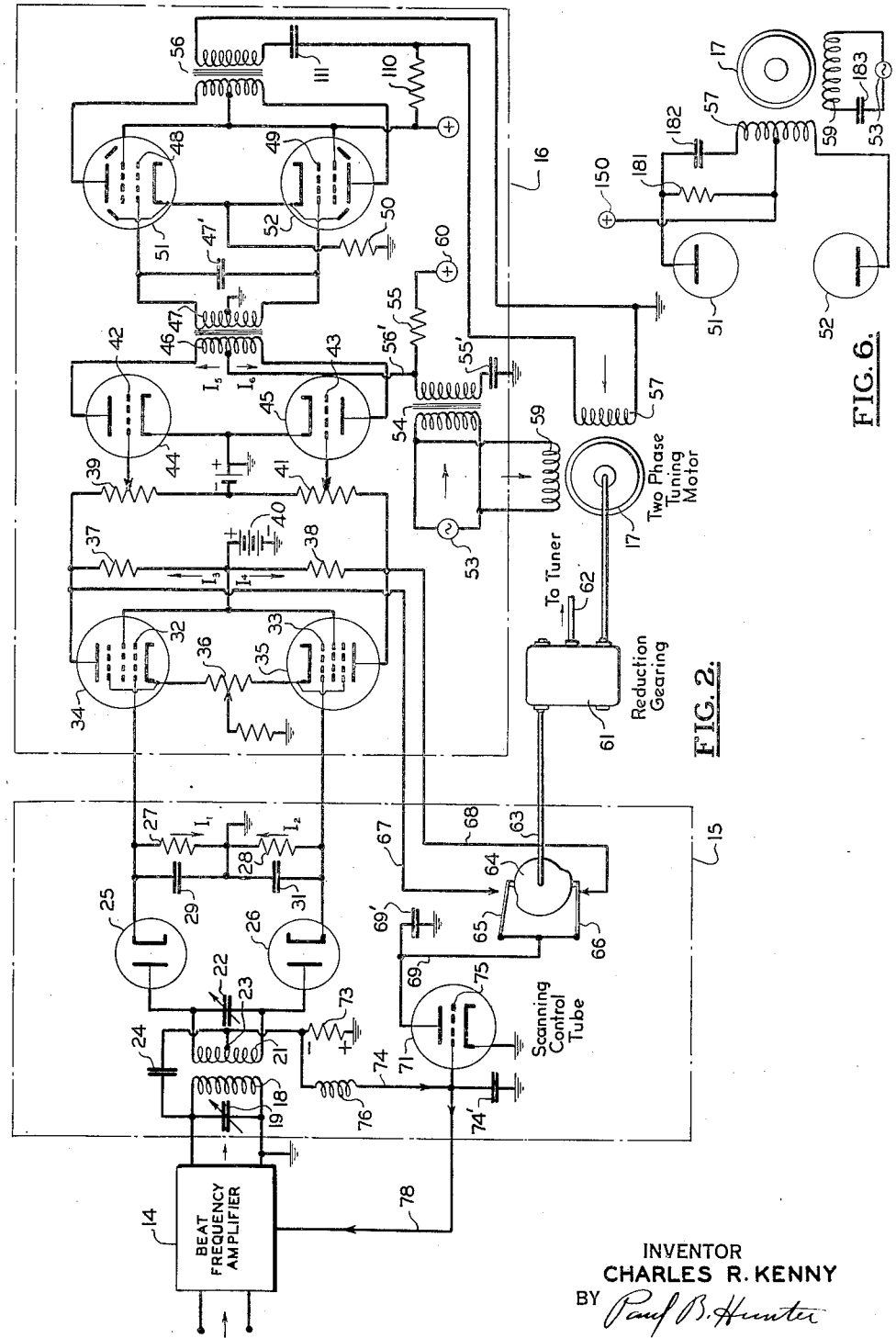
Fig. 2 is a combined wiring and diagrammatic view showing control circuit details of the invention.

Fig. 2 illustrates details of the control arrangements comprising the major portion of the invention. The difference frequency alternating voltage is delivered to discriminator and scanning control circuit 15 across the transformer primary 18. The primary transformer circuit may be tuned to the required difference frequency by variable condenser 19. Transformer secondary 21 also forms a tuned circuit with variable condenser 22.

The difference frequency voltage from amplifier 14 is also fed to the center tap 23 of transformer secondary 21 through a condenser 24 so that the phase of that voltage differs by 90° from that induced in secondary 21. The opposite ends of secondary 21 are connected to the anodes of rectifiers 25 and 26, and the cathodes of rectifiers 25 and 26 are connected to ground through equal resistors 27 and 28. Alternating current by-pass condensers 29 and 31 are provided across the respective resistors. The center tap 23 is also connected to ground through resistor 73.

In operation of the discriminator, the transformer primaries and secondaries are tuned to the desired difference frequency, and a quadrature phase component of the difference frequency voltage is added by way of condenser 24 to each of the voltages induced in each half of secondary 21. These resultant voltages are rectified by rectifiers 25 and 26 during opposite half cycles, producing direct current flow $I_1$, $I_2$ in opposite directions through resistors 27 and 28, as illustrated.

When the difference frequency is constant at the desired value, that is when the output frequency of oscillator 12 is constant and differs from that of oscillator 11 by the proper amount, the vectorial sums of the added difference frequency voltages are equal and the opposite currents $I_1$ and $I_2$ are equal. The equal voltage drops across resistors 27 and 28 provide equal bias voltages on control grids 32 and 33 of direct current amplifier tubes 34 and 35, respectively. Under these conditions, no control is necessary or provided in the system.

When the difference frequency is different from or changes from its desired value, as where the output frequency of oscillator 12 varies, the primary voltage introduced at tap 23 is no longer in 90° phase relation with the voltages in the tuned secondary halves. The vector sums of the added difference frequency voltages are now unequal, resulting in unequal unidirectional voltage drops across resistors 27 and 28, the sense of the resultant of these voltage drops depending on the direction of change in the difference frequency. Under these conditions, unequal voltages are applied to grids 32 and 33, for initiating control operation to be hereinafter described.

The voltage drop appearing across resistor 73 is created by the sum of the currents $I_1$ and $I_2$ flowing therethrough, and will appear whenever any difference frequency voltage is applied to the discriminator. Therefore this voltage drop indicates the existence of a difference frequency within the control range of the discriminator.

Tubes 34 and 35 and associated elements comprise a direct current amplifier circuit. The cathodes of tubes 34 and 35 are connected to ground through an adjustable cathode biasing and balancing resistor 36, and their anodes are connected through equal plate load resistors 37 and 38 to ground through battery 40. Opposite currents $I_3$, $I_4$ flow in the resistors as indicated. The voltage drops across resistors 37 and 38 also appear across voltage divider input resistors 39 and 41 having adjustable taps connected to respective control grids 42 and 43 of a pair of triodes 44 and 45 forming a balanced modulator circuit.

The plates of tubes 44 and 45 are connected to opposite ends of a transformer primary 46 whose secondary 47 is connected to control grids 48 and 49 of power amplifier tubes 51 and 52 of a power amplifier circuit. Condenser 47' is connected across secondary 47 and by-passes undesired alternating components of the transformer output. Resistor 50 is the usual common cathode bias resistor connected between the cathodes of tubes 51, 52 and ground.

A source of alternating voltage 53, which may be the usual 60 cycle, 120 volt line, is impressed across the primary of transformer 54. One terminal of the secondary of transformer 54 is connected to ground through condenser 55' and the other terminal to a lead 56'. The secondary of transformer 54 applies a modulating alternating voltage by lead 56' to the midpoint of transformer primary 46 connected thereto. A positive unidirectional voltage source 60 is also connected to this midpoint through a voltage-dropping and isolating resistor 55. Blocking condenser 56' prevents flow of direct current in the secondary of transformer 54.

The power amplifier comprising tubes 51 and 52 is a push-pull arrangement for amplifying the modulated output of the balanced modulator 44, 45, and the output of the power amplifier 51, 52 appears across the secondary of transformer 56 which is connected across one field winding 57 of the two-phase tuning motor 17 through condenser 111. The other field winding 59 of motor 17 is connected directly to source 53, to be energized therefrom in phase quadrature relation with respect to the energization of winding 57.

Motor 17 drives reduction gearing 61 from which a shaft 62 extends to operate the tuning mechanism shown in Fig. 1. A second driven shaft 63 extends from gearing 61 for rotating a cam 64 arranged to alternately move the shiftable arms of switches 65 and 66 to closed position.

One terminal of switch 65 is connected to one side of the output of the direct current voltage amplifier 34, 35 above described by lead 67. The corresponding terminal of switch 66 is connected to the other side of the amplifier output by lead 68. The other terminals of the switches are connected by common lead 69 to the plate of scanning control tube 71. A lead 74 connects resistor 73 to the control grid 75 of tube 71 to provide a negative bias thereon when there is a voltage drop across resistor 73, a choke coil 76 being provided in this lead to impede the flow of radio frequency current. Condenser 74' is connected between grid 75 and ground, and together with the grid-cathode capacitance of tube 71 is effective in by-passing radio frequency current. The plate of tube 71 is grounded for high frequencies through radio frequency by-pass condenser 69'.

Oscillator 12 comprises a stationary cylindrical barrel 76 enclosing resonator chambers 77 and 78. Flexible end wall 79 of chamber 77 carries one of the spaced input grids 81, and flexible end wall 82 of chamber 78 carries one of the spaced output grids 83. Outer grids 81 and 83 are rigid with enlarged external flanges 84 and 85, while internal grids 81 and 83 are rigid with a third external flange 86 located intermediate the other two flanges. Flange 86 is rigidly secured to a base 87, as by integral rib 88.

Flange 86 is formed with opposed projecting fulcrums 88 and 89 for adjacent ends of levers 91 and 92 respectively. The other ends of levers 91 and 92 are connected by pivotal toggle bars 93 and 94 to a non-rotatable nut 95 adapted to travel along a threaded section 96 of shaft 62. The inner end of shaft 62 is mounted on a thrust bearing 97 seated on rib 88.

Lever 91 is connected to transmit motion to flange 84 by an adjustable screw 98 and universally jointed toggle pin 99. Similarly, lever 92 is connected to transmit motion to flange 85 by an adjustable screw 101 and universally jointed toggle pin 102.

A buffer resonator chamber 103 is formed with a flexible end wall 104. Grids 105 in the opposite end walls of chamber 103 are rigid with flange 85 and a fourth external flange 106, respectively. A series of uniformly spaced adjustable screws 107 (only one shown) are provided between flanges 85 and 106. Similarly, several tension springs 108 (only one shown), anchored at opposite ends of flanges 84 and 106, take up mechanical play and keep the tuning adjustments positive.

Oscillator 12 is provided with a cathode 108' for projecting an electron beam successively through the resonators by way of their respective pairs of grids, and a feed-back loop 109 is provided for feeding energy from chamber 78 to the field within chamber 77 to produce oscillations which may be extracted from buffer resonator 103 by way of a concentric line connection 103'.

As shaft 62 turns in either direction, nut 95 correspondingly travels longitudinally thereof. Any suitable device such as a leaf spring 95' may be employed to hold nut 95 against rotation. When nut 95 travels away from bearing 97, levers 91 and 92 are rocked about their fulcrums to simultaneously cause increased spacing of the input and output grids to gang tune resonators 77 and 78. When nut 95 travels toward bearing 97, springs 108 accomplish the reverse tuning operation by reducing the grid spacing in each pair. The buffer resonator may be tuned by adjusting screws 107, and such tuning adjustment is not altered by the gang tuning operation above described. If desired a large coil spring (not shown) may be provided about shaft 62 to maintain the shaft under rotational stress and prevent mechanical lag or play in the system. Also, if desired, switches 65 and 66 or their equivalents may be operated directly by the to and fro travel of nut 95 instead of by cam 64, which latter is illustrated mainly for clarity of disclosure, or may be replaced by a toggle switch thrown at each limit of travel of nut 95 by a suitable projecting yoke on nut 95. No detailed mechanical disclosure is believed necessary to illustrate this arrangement.

*Operation*

System 11 and oscillator 12 are energized. The primary 18 and secondary 21 of the discriminator transformer are tuned to a frequency equal to the difference frequency which will obtain when oscillator 12 is at desired output frequency with respect to the reference frequency of system 11. This will be referred to as the desired difference frequency. If the actual difference frequency output from amplifier 14 is not equal to the desired difference frequency, as will certainly be the case during warm-up conditions, the voltage drops across resistors 27 and 28 will be different for reasons above explained in discussing the discriminator action. Whether the actual difference frequency is greater or less than the desired difference frequency determines which resistor 27 or 28 has the greater voltage drop.

The unequal voltage drops in resistors 27 and 28 are amplified in the direct current amplifier 34, 35 and appear as unequal voltage drops across resistors 37 and 38, respectively. These unequal voltages are applied to the control grids 42, 43 of the balanced modulator system 44, 45, wherein the relative magnitude of these control voltages determines the direction of control of the motor 17 and of the output frequency of oscillator 12.

For example, should the voltage drop across resistor 37 be larger than that across resistor 38, tube 44 of the balanced modulator will be less conductive than tube 45. This means that alternating current $I_5$ in one half of transformer primary 46 will be smaller than corresponding alternating current $I_6$ in the other transformer primary half. The difference between these two alternating currents then represents, in phase sense and amplitude, the effective modulator output current. The induced output voltage in secondary 47 will then be opposite in phase to this output current. On the other hand, should the drop across resistor 38 be larger than the drop across resistor 37, the induced output voltage in secondary 47 will be opposite in phase from its former value. Thus the sense of the actual difference frequency relative to the desired frequency determines the phase sense of the control voltage derived from the balanced modulator, that voltage being of predetermined phase when the actual difference frequency is the higher, and being 180° different in phase when the actual difference frequency is the lower.

The control voltage induced in secondary 47 is amplified in the power amplifier 51, 52 and applied to motor winding 57. The voltages in the two-phase motor field windings 57 and 59 are 90° apart in phase, and this relation may be exactly insured if necessary by inserting a phase shifting device of any known type between transformer 56 and winding 57, or between source 53 and winding 59. Whatever the phase of the control voltage in secondary 47, it will therefore appear in winding 57 as 90° on either side of the voltage of winding 59, and therefore will determine the direction of rotation of motor 17.

An important part of the invention resides in the damping of motor 17, to prevent over-running or hunting. To this end I provide a resistor 110 connected as shown between a source of direct current (which may be source 60) and one end of winding 57, the other end being grounded so that a direct current is produced through field winding 57. Blocking condenser 111 keeps direct current out of transformer 56. This direct current produces a magnetic flux linked with the motor rotor, which during operation provides a variable braking action that increases proportionately with the motor speed. The exerted damping torque is independent of the rotor position, there is almost no coasting of the rotor, and the motor speed tends to become a direct and nearly proportional function of the voltage applied to winding 57.

Rotation of motor 17 causes rotation of tuning mechanism shaft 62 to alter the frequency output of oscillator 12. Thus, should a signal corresponding to the actual difference frequency be fed into the discriminator, the above described operation is effective to tune oscillator 12 to its desired output frequency under control of the discriminator. When that desired output frequency is attained, the actual difference frequency equals the desired difference frequency, the voltage drops across resistors 37 and 38 are equal, and there is no control voltage induced in secondary 47 so that motor 17 leaves oscillator 12 tuned to the desired output frequency.

However, the output frequency of oscillator 12 may be so far different from that of system 11 that the actual difference frequency is beyond the control range of the discriminator, whereby no difference frequency signal is derived from the output of the discriminator. Unless auxiliary measures are taken there will then be no control voltage in the system, and the frequency of oscillator 12 will be temporarily uncontrolled. In the preferred form of my invention, I solve this difficult problem by repeatedly tuning oscillator 12 over substantially its entire tuning range, detecting when an actual difference frequency is realized which is within the discriminator range, and then turning over frequency control of oscillator 12 solely to the discriminator and control action above described.

For this purpose, I use a scanning tube 71 which is a triode having a very high plate impedance when biased beyond cut-off, but a relatively low internal impedance otherwise. Rotation of cam 64 places tube 71 in parallel with either of resistors 37 or 38. Cam 64 is always in such position as to close either switch 65 or switch 66. Tube 71 is normally maintained at zero bias, which is not quite the cut-off bias.

Assume now that oscillator 12 is energized but its frequency is such that no control voltage is obtained from the discriminator as above indicated, and that cam 64 happens to be positioned to close switch 66 as illustrated. Since there is then no voltage across resistor 73, tube 71 is conductive and it is connected by switch 66 in parallel with resistor 38. This unbalances the control circuit to produce a smaller voltage on control grid 43 than on control grid 42, just as if unequal voltage drops had been produced in the resistors 37 and 38 by discriminator operation. This unbalance causes operation of the tuning motor to tune oscillator 12 through its frequency range in one direction or sense of frequency variation. When the tuning limit in that direction is reached, cam 64 is of such design that it opens switch 66 and closes switch 65 to place tube 71 in parallel with resistor 37, thus unbalancing the control circuit in the other direction, and causing motor 17 to tune oscillator 12 back across its entire range.

The above process is cyclic, and the apparatus continuously and repeatedly varies the oscillator frequency over, or "scans," a wide frequency range so long as no frequency is presented which lies within the operating range of the discriminator. However, as soon as an oscillator output frequency is produced whose corresponding actual difference frequency falls within the discriminator operating frequency range, a condition which is immediately detected by my invention due to the appearance of a control voltage across resistor 73 in the discriminator, the above described discriminator action takes over to the exclusion of the scanning operation, and becomes effective to accurately bring oscillator 12 to its desired output frequency and keep it there.

Thus, when the actual difference frequency thus introduces a control voltage into the discriminator, a unidirectional voltage appears across resistor 73 and is applied as a negative voltage to grid 75, thereby rendering tube 71 non-conductive. The operation of cam 64 is now ineffective to control the system, since tube 71 is an effective open circuit because of its high cut-off impedance, and no longer exercises any influence in the control circuit. Thus, through this phase of my invention, appearance of a signal in the discriminator output automatically eliminates actuation of the tuning mechanism by the scanning tube, and places the tuning mechanism under sole control of the discriminator. The negative bias for grid 75 may be provided, if desired, directly from amplifier 14, or in any equivalent manner, to signal that the difference frequency is within the discriminator range. Thus my scanning means, although preferably utilizing a portion of the circuit of and controlled by the discriminator, as already described, is operable distinct from the operation of the discriminator.

The invention includes also automatic volume regulation for the control circuit. This is accomplished by lead 78 which feeds back a negative potential from resistor 73, for application to a suitable volume control device in amplifier 14, such as to the grids of the amplifier tubes. As the amplitude of the difference frequency voltage becomes larger, the potential on lead 78 becomes larger, and reduces the output of amplifier 14 proportionately. Details of the actual connections within amplifier 14 may be as in known automatic volume control circuits and need not be further described.

It will be understood that the illustrated direct current amplifier, balanced modulator and power amplifier may be replaced in the control circuit of Fig. 2 by any equivalent arrangement for converting the discriminator output to motor control voltages having the reversible phase-sense above described, without departing from the spirit of the invention.

My illustrated invention therefore provides a system which is speedily effective to automatically tune a high power oscillator of the electron beam hollow resonator type to a desired output frequency and to maintain it there. The system is especially advantageous in the embodiment of scanning arrangements for extending control over a very wide arrange, and other novel control features. It will be understood that the invention of course is not limited to actuation of the particular tuning mechanism shown by way of example in Fig. 1, but may be equally well applied to any tuning mechanism or means for such oscillators, or for other types of oscillators susceptible of such mechanical or equivalent tuning control.

Furthermore, while the invention has been described as especially adapted for maintaining oscillator 12 or some other source at constant output frequency, it is equally well adapted for maintaining any two ultra high frequency or other sources at a constant difference frequency, as is obvious from the above, regardless of variations in frequency in either source. For example, the invention may be employed for maintaining the local oscillator of a heterodyne system in fixed frequency relation to a received signal. Similar applications of the invention are obvious.

In the above, as in all hereinafter described embodiments of the invention, scanning is accomplished by continuous wave energy actuating the oscillator tuning mechanism.

*Further embodiments*

Figure 3:
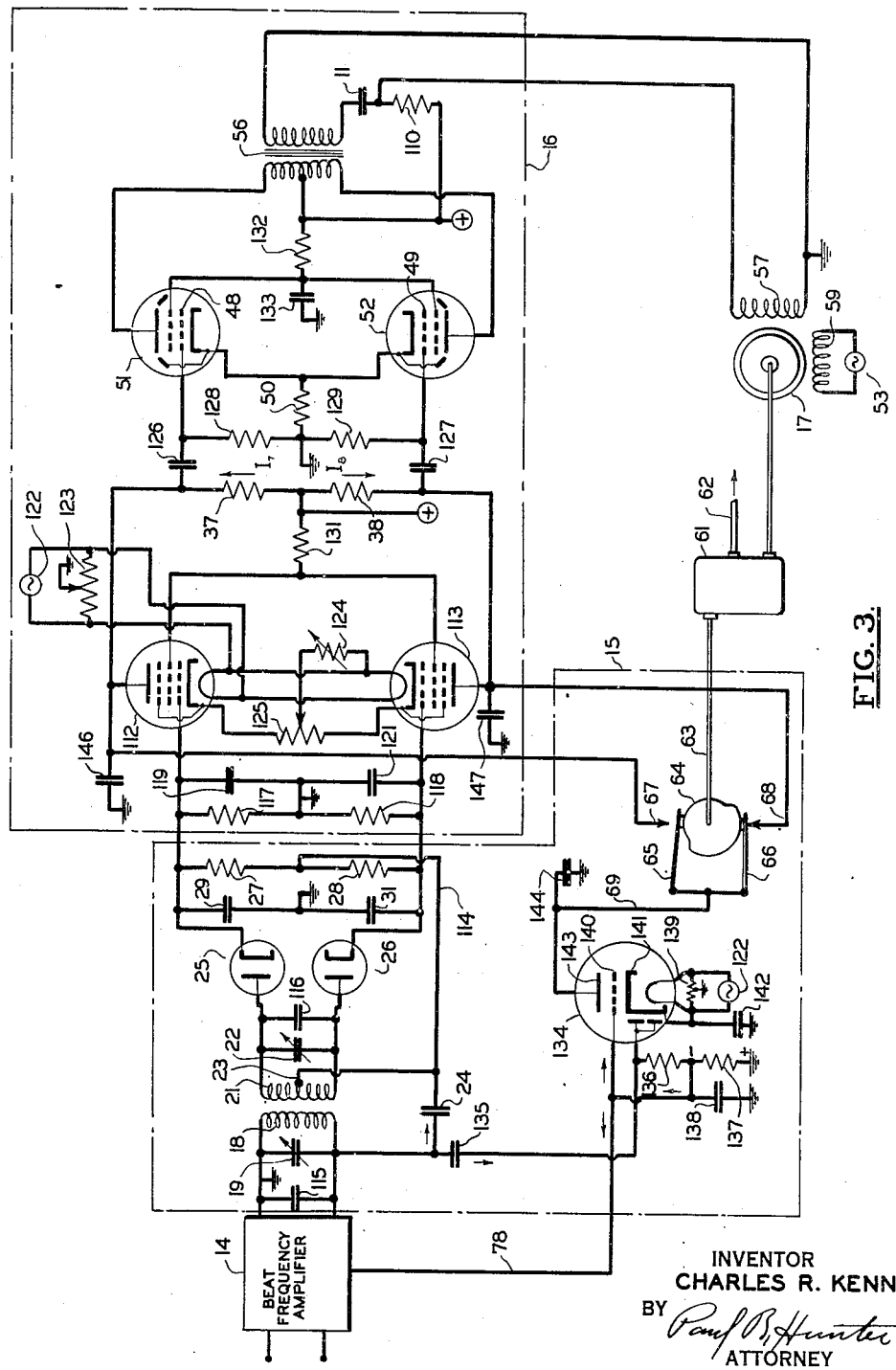
Fig. 3 is a combined wiring and diagrammatic view illustrating a further embodiment of the invention utilizing a simplified circuit.

Fig. 3 illustrates a further embodiment of the invention wherein the separate balanced modulator of Fig. 1 is eliminated. The difference frequency amplified at 14 passes through a discriminator, as before, and the discriminator output is impressed on a combined voltage amplifier and modulator circuit containing tubes 112 and 113, similarly to Fig. 1.

In Fig. 3, instead of grounding the common connection between load resistors 27 and 28 of the discriminator, I connect that common connection back to tap 23 of the transformer secondary 21 through a lead 114. The common connection between the resistors is therefore maintained floating with respect to ground. If necessary, compensating condensers 115 and 116 are provided in the transformer input and output circuits. Resistors 117 and 118 serve as input resistors for the voltage amplifier 112, 113, and these resistors are provided with low frequency by-pass condensers 119 and 121 for eliminating alternating components from the discriminator output.

The direct current output of the voltage amplifier and modulator circuit is modulated by introduction of a small alternating voltage in series with the common cathode circuit, as illustrated. The alternating filament supply voltage for tubes 112 and 113, derived from source 122, is impressed across a resistance 123 which is center-tapped to ground, and one leg of the common filament circuit is connected through common variable bias resistor 124 to an adjustable balancing tap on the differential cathode biasing resistor 125. This provides a small alternating voltage between cathode and ground in each of tubes 112 and 113 for modulating the plate current in each tube circuit. Thus, whereas in Fig. 2, the voltage amplifier 34, 35 produced a direct current output which resulted in unidirectional voltage drops across resistors 37 and 38, the voltage amplifier 112, 113 of Fig. 3 has an alternating current output.

The opposed alternating currents $I_7$ and $I_8$ in the voltage amplifier output produce corresponding alternating voltage drops across resistors 37 and 38, and coupling condensers 126 and 127 permit only the alternating components of these voltage drops to appear across input resistors 128 and 129 and on the control grids 48 and 49 of tubes 51 and 52 of the power amplifier. Resistor 131 is the screen voltage dropping resistor for tubes 112 and 113, and resistor 132 in the screen grid circuit of tubes 51 and 52 provides direct voltage to the latter screen grids, the usual screen grid by-pass condenser being indicated at 133.

In operation, the polarity of the discriminator output determines which of currents $I_7$ or $I_8$ is larger and therefore determines the phase-sense and amplitude of the output of the power amplifier 51, 52. The output voltage across the secondary of transformer 56 therefore depends in amplitude upon the amplitude of the difference frequency voltage from amplifier 14, and depends in phase-sense or polarity on whether the actual difference frequency is greater or less than the desired difference frequency, as in Fig. 2. Utilization of the output of transformer 56 to actuate the tuning mechanism of oscillator 12 is the same as in Fig. 2.

The scanning control arrangements are also different in Fig. 3. The scanning control tube is here a multi-purpose tube such as a duo-diode-triode 134. The triode section operates in the same manner as the tube 71 of Fig. 2. The diode section is used to provide the negative cut-off bias for the triode section, and for this purpose rectifies a version of the output of amplifier 14, being connected to the output thereof through a blocking or coupling condenser 135. A portion of the resulting unidirectional voltage appearing across resistors 136 and 137 is filtered by by-pass condenser 138 and applied to the control grid 140 of the triode section of tube 134. This same voltage may also be used as the automatic volume control voltage for amplifier 14 on lead 78.

I have found that the impedance of the triode section of tube 134 is normally insufficient to unbalance the modulated output of the voltage amplifier 112, 113 when placed in parallel with either resistance 37 or 38 by operation of the switches 65, 66 controlled by cam 64 as in Fig. 2. To remedy this I provide means whereby the output of tube 134 produces the desired unbalance.

As illustrated, the alternating filament supply voltage of tube 134, derived from source 122, is connected across a resistor 139 which is center-tapped to ground. This resistor may be resistor 123, already described. The cathode 141 of tube 134 is by-passed to ground by radio frequency by-pass condenser 142, and plate 143 is similarly by-passed to ground through radio frequency by-pass condenser 144. Cathode 141 is connected to one leg of the filament, so that the output of the triode section of tube 134 appearing on lead 69 is modulated by the alternating voltage between cathode and plate. Switch output leads 67 and 68 are grounded through radio frequency blocking and by-pass condensers 147 and 146 to prevent direct current return to ground, and to prevent any transient switching effects.

During scanning, the motor-driven cam-controlled switch 64 alternately places the triode section of tube 134 in parallel with tube 112 or 113, as in Fig. 2. For example, when switch 64 is positioned as illustrated, the triode section of tube 134 and tube 113 then have a common load resistor 38, and the resultant voltage drop across resistor 38 produced by both tubes 134 and 113 is sufficient to unbalance the motor control circuit just as if the discriminator were exercising control. Reverse unbalance is obtained when switch 65 is closed, with switch 66 open.

The above scanning operations continue cyclically, as in Fig. 2, until a voltage passed by condenser 135 indicates that the actual difference frequency is within the discriminator control range, and results in the above-described unidirectional drop across resistors 136 and 137. This provides a negative bias on grid 140, thereby cutting off the tube and eliminating its scanning control function, the discriminator action now assuming control of tuning.

The above arrangement is especially advantageous in that control of the scanning arrangements and automatic volume control are independent of the discriminator output, and automatic volume control is maintained while tube 134 is non-conductive as well as during scanning. Other than above described, the apparatus of Fig. 3 functions similarly to that of Fig. 2, and the various modifications of Fig. 2 may also be applied to Fig. 3.

Figure 4:
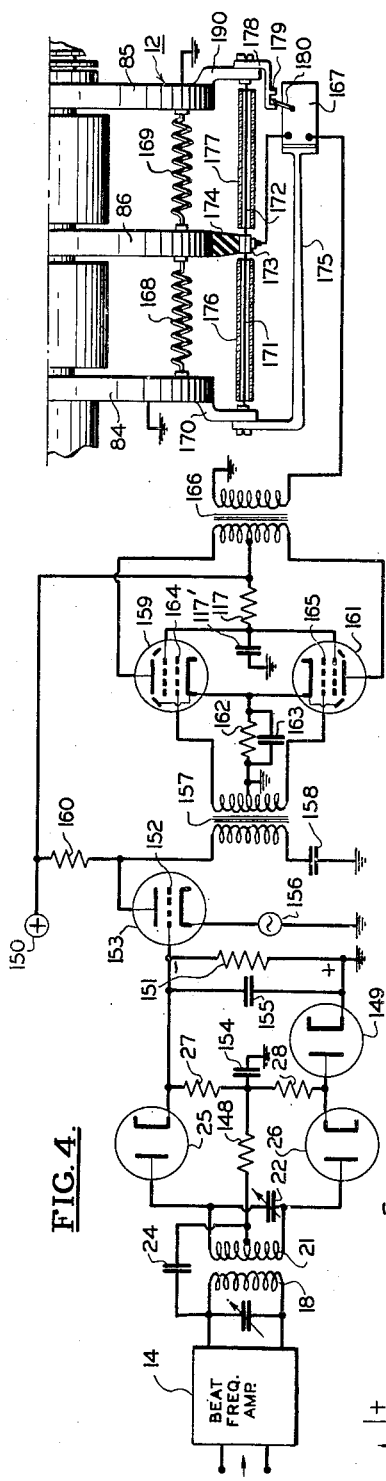
Fig. 4 is a combined wiring and diagrammatic view illustrating a further embodiment of the invention utilizing thermally responsive tuning devices.

Fig. 4 illustrates an embodiment of the invention wherein tuning of oscillator 12 is accomplished through thermally responsive devices.

The discriminator in Fig. 4 is substantially the same as that of Fig. 2 as indicated by corresponding reference characters, resistor 148 corresponding to resistor 73 of Fig. 2. However, the junction of resistors 27 and 28 is here not grounded, but by-passed to ground by condenser 154.

One side of the discriminator output is connected to a diode rectifier tube 149 in series with a load resistor 151 by-passed by condenser 155, arranged to make the frequency control circuit operable only when the difference frequency is such as to produce a negative output from the discriminator. This condition prevails when the actual output frequency of oscillator 12 differs only in a predetermined direction from the desired output frequency. The drop across output resistor 151 therefore provides a negative bias voltage for the control grid 152 of a scanning control tube 153; and the magnitude of this voltage, which depends on the magnitude of the difference frequency in the selected direction, controls current flow through tube 153.

A small alternating modulating voltage is introduced into the circuit of tube 153 by means of the illustrated connection of its cathode to any suitable alternating current source 156.

The output circuit of tube 153 contains the primary of transformer 157, whose secondary serves as the input of a push-pull power amplifier circuit like that of Fig. 2. Condenser 158 blocks direct current from the primary of transformer 157, the anode voltage for tube 153 being supplied from a source 150 through a resistor 160.

The power amplifier 159, 161 has substantially the same elements as that of Fig. 2, comprising tubes 159 and 161 connected in push-pull and having a common cathode bias resistor 162 and by-pass condenser 163. The secondary of transformer 157 is connected at opposite ends to control grids 164 and 165 of tubes 159 and 161, respectively, and has its center tap grounded. The output of the power amplifier is derived from the secondary of output transformer 166, which corresponds to transformer 56 in Fig. 2, and energizes the thermal tuning devices, one end of the secondary being connected to the grounded frame of oscillator 12, and the other end of the secondary being connected to one terminal of a toggle switch 167.

Flanges 84, 85 and 86, which are attached to the oscillator tube grids as shown in Fig. 1, are here urged apart by compression springs 168 and 169. Flanges 84 and 85 are provided with rigid radial conductive projections 170, 190 to which are secured the opposite ends of thermal struts or wires 171 and 172. The adjacent ends of the thermal strut wires are secured to a common terminal 173 carried by flange 86 but insulated therefrom as by insulator block 174. Terminal 173 is connected to the other terminal of switch 167. Switch 167 is held rigid with flange 84, as by illustrated support 175, and is of the well known toggle type which snaps between open and closed limit positions.

Springs 168 and 169 normally maintain wires 171 and 172 taut, and loose collars 176 and 177, preferably of some electrical and heat insulating material, are provided surrounding the respective wires for protecting against local drafts and temperature changes.

Flange 85 carries a rigid switch actuating arm 178 carrying a yoke 179 operating toggle switch lever 180. When switch lever 180 is in its closed position, struts 171 and 172 are connected electrically in parallel across the output of transformer 166, and will be energized by said output. When there is no signal issuing from the discriminator, the output of tube 153 corresponds to an amplified version of the modulating voltage derived from source 156, and this output energizes the scanning operation of my system.

Assume that oscillator 12 starts cold, and that no signal from the discriminator is provided on grid 152. The output frequency of the oscillator is now maximum. Switch lever 180 is disposed in the illustrated closed position. Energization of struts 171 and 172 by current from the output of tube 153 expands them, and permits springs 168 and 169 to separate the flanges, thereby altering the grid spacing to gang tune the oscillator to decrease its frequency.

After struts 171 and 172 have expanded a certain amount, usually corresponding to the entire tuning range of oscillator 12, switch lever 180 is moved sufficiently by yoke 179 to snap to its open position to break the circuit. Struts 171 and 172 then begin to cool, and their contraction during cooling tunes the oscillator back over its range until yoke 179 again snaps the switch closed to reenergize the struts and repeat the first part of the operation. It will be clear that switch 167 could be operated by relative motion between flanges 84 and 86, or 86 and 85, if desired.

The above operation is cyclic and will repeat in like manner as long as sufficient energy is received from transformer 166 to energize the tuning struts, and until a control signal is received from the discriminator. Tube 153 is of such nature as to have predetermined conductivity when the grid has zero bias, and its conductivity is reduced as the grid bias becomes more negative.

Figure 5:
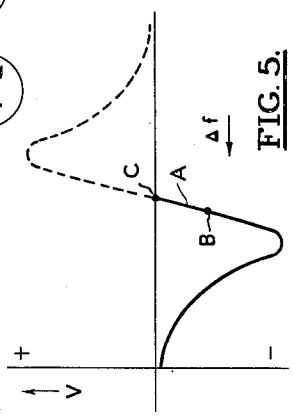
Fig. 5 is a graph illustrating and explaining the scanning operation of the circuit of Fig. 4.

Fig. 5 illustrates the frequency response of the discriminator as the actual difference frequency $\Delta f$ changes. The dotted line positive part of the curve represents the discriminator output voltages which are ineffective due to the effect of diode 149 in the circuit, and only such difference frequencies as produce negative discriminator output are effective to control tuning, as will be explained.

As the oscillator frequency decreases, the difference frequency also decreases, approaching the solid line discriminator range illustrated in Fig. 5. During this sweeping, a positive discriminator output voltage is first obtained, corresponding to the dotted portion of Fig. 5. This positive voltage is blocked by diode 149, so that no voltage is produced across resistor 151. When the actual difference frequency passes the desired value, corresponding to point C, the polarity of the discriminator output reverses, and provides a negative bias on grid 152 which becomes more negative as the frequency continues to change in that direction. As grid 152 becomes more negative it reduces conductivity of tube 153, and the reduced output of tube 153 causes the thermal responsive devices to vary the oscillator frequency at a slower rate.

Eventually, when the negative bias of tube 153 becomes sufficient to so reduce the output of tube 153 that such output merely maintains the tuning struts at a relatively constant temperature while supplying losses due to radiation, etc., the system becomes substantially balanced to thereby hold oscillator 12 at the corresponding frequency level. This balance will take place, for example, when the descending difference frequency reaches the point B on the curb in Fig. 5.

Should the difference frequency now change in either direction from point B, the resultant increase or decrease in the output of tube 153 will heat or cool the tuning struts. The resultant change in frequency will produce a change in control voltage across resistor 151 so as to restore the oscillator frequency toward its former value, corresponding to point B of Fig. 5. In practice, I have observed that the above-described thermal control maintains the output frequency of oscillator 12 within a range of about 5 kilocycles, when operating at about 3000 megacycles which is satisfactory for most purposes.

It will be noted that here the discriminator can take control away from the scanning mechanism only when the oscillator and difference frequencies are decreasing. For, with increasing frequency, the switch 167 is open, and no control action, other than frequency change with strut cooling, is possible.

The apparatus of Fig. 4 thus embodies thermally responsive tuning control means for scanning a frequency range, and arrangements for detecting and applying a discriminator output signal to take over automatic tuning control of the oscillator 12 while suppressing the scanning operation.

It will be noted that, referring to Fig. 5, the descending difference frequency passes through the point C which represents the point where oscillator 12 is at desired output frequency and is theoretically an optimum control position. However, since at this point there is no discriminator output and the bias of grid 152 is zero, the scanning operation is not affected, and it is not until the oscillator is slightly off frequency in the region A that the control action above-described is possible. By making the system very sensitive, the frequency at point B will differ immaterially from that at point C.

Obviously the output of transformer 166 in Fig. 4 may be employed to operate a motor such as that at 17 in Fig. 1 for tuning the oscillator in one direction over the scanning range. Return scanning movement may be had by means of a suitable releasable clutch and spring bias in the motor drive, for example.

Referring to Fig. 6, which illustrates an alternate manner of connecting the output of any of the systems of Figs. 2 or 3 to the motor, the plate circuits of tubes 51 and 52 are connected directly across field winding 57 of the tuning motor. Direct current is prevented by condenser 182 from flowing through one half of winding 57. A resistor 181 conducts direct current from source 150 to tube 51. In the usual push-pull circuit the opposite unidirectional plate currents in the halves of the primary of the output transformer magnetically cancel each other out, but the above arrangement insures against such action and provides a relatively constant direct current energization of winding 57. Operation is the same as described in Fig. 2, with the direct current energized winding providing reliable damping and braking and with the advantage that the apparatus is simplified by elimination of transformer 56. If needed, a phase control condenser 183 may be used in the circuit of motor winding 59.

Figure 7:
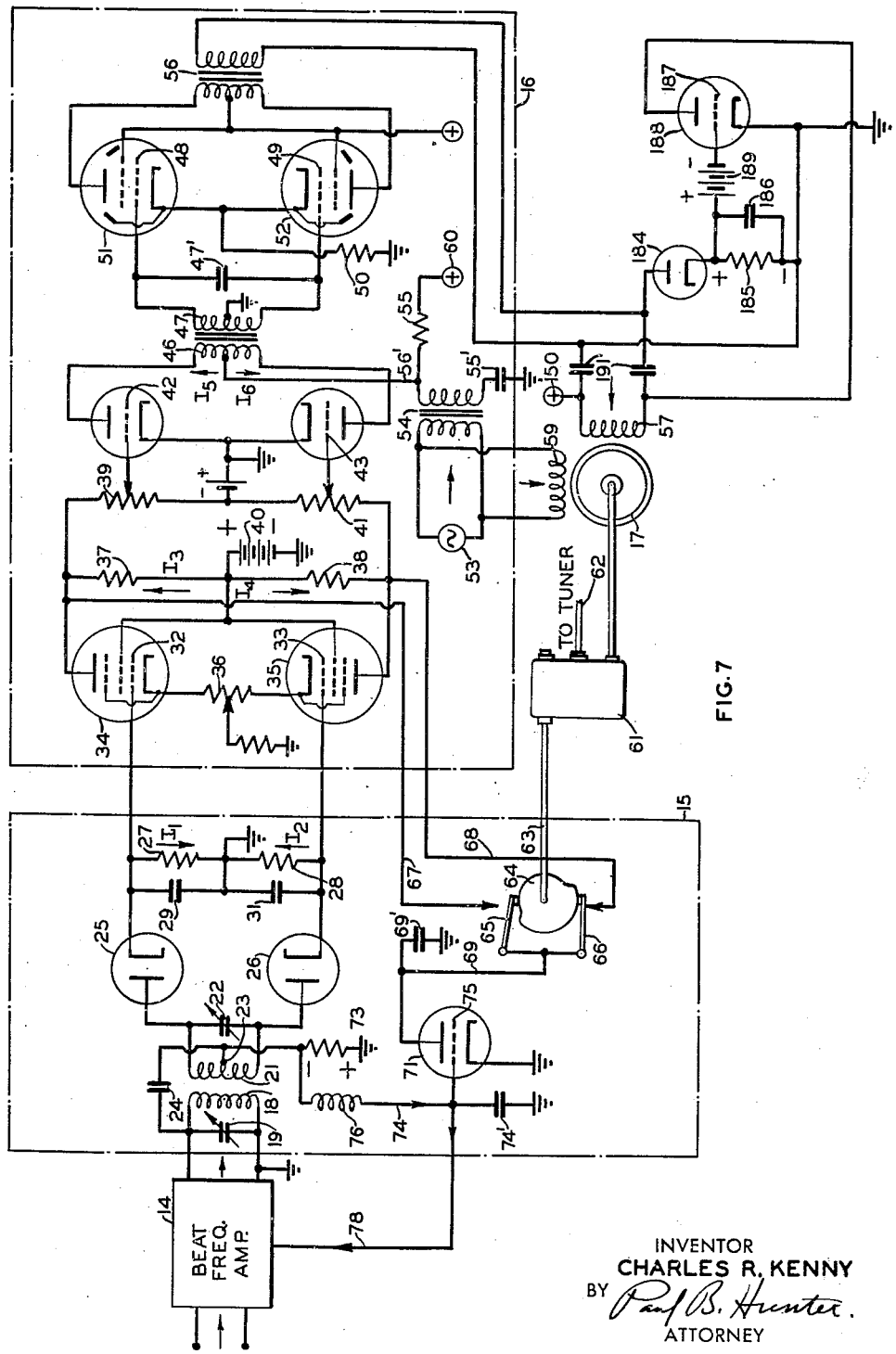
Fig. 7 is a wiring diagram illustrating a further embodiment of the invention wherein a vacuum tube is employed in the direct current motor braking arrangements.

Referring to Fig. 7 wherein there is illustrated another embodiment of the present invention, a further type of direct current damping arrangement for the tuning motor 17 is illustrated, adapted for use in a manner similar to that disclosed in Fig. 2. In this figure, parts similar to those shown in Fig. 2 are referred to by similar reference numerals. A rectifier 184 and its output resistor 185 are connected across the output of transformer 56. By-pass condenser 186 eliminates alternating current from the unidirectional voltage drop which appears across resistor 185 whenever a motor driving signal appears in the output of transformer 56. This direct current voltage varies in strength proportionally to the departure of the actual difference frequency from the desired difference frequency, and is zero when there is no signal from the discriminator and maximum when the signal from the discriminator is strongest. It is applied to control grid 187 of normally non-conductive triode 188 through a biasing battery 189 which keeps the grid from going positive during normal operation. A source of positive potential 150 is connected to the anode of tube 188 through motor winding 57. Blocking condensers 191 keep the direct current out of transformer 56. The polarity of this direct current is thus independent of the direction of rotation of the motor or of the sense of deviation of the actual difference frequency from the desired difference frequency.

In operation, whenever a motor control signal appears in the output of transformer 56, a version of it is rectified and applied to the grid of normally blocked tube 188 to initiate flow of direct current through winding 57. As the motor control signal increases in strength, tube 188 is made more conductive, thereby increasing the damping action for higher motor control voltages, corresponding to higher motor speeds.

However, when there is no motor control signal from the discriminator, as during scanning, the scanning voltage produced by unbalance of the modulator by the scanning control tube is not of sufficient amplitude when rectified by rectifier 184 to overcome the bias of battery 186. Accordingly, tube 188 remains non-conducting during scanning, and no damping is produced during such scanning.

In this embodiment, therefore, I have provided a direct current damping arrangement for the tuning motor which is inversely proportional to the departure of the actual output frequency of oscillator 12 from the desired output frequency. There is no damping during scanning, and the damping is maximum during the period the discriminator action controls.

In any of the above-described direct current damping arrangements, the direct current for braking may be introduced into the fixed phase winding 59, if desired. The damping arrangements of Figs. 2, 6 and 7 may be interchangeably employed in any tuning motor control apparatus. The damping control circuit of Fig. 7 may of course be used directly in the system of Fig. 3 and will operate therein exactly as just described.

Figure 8:
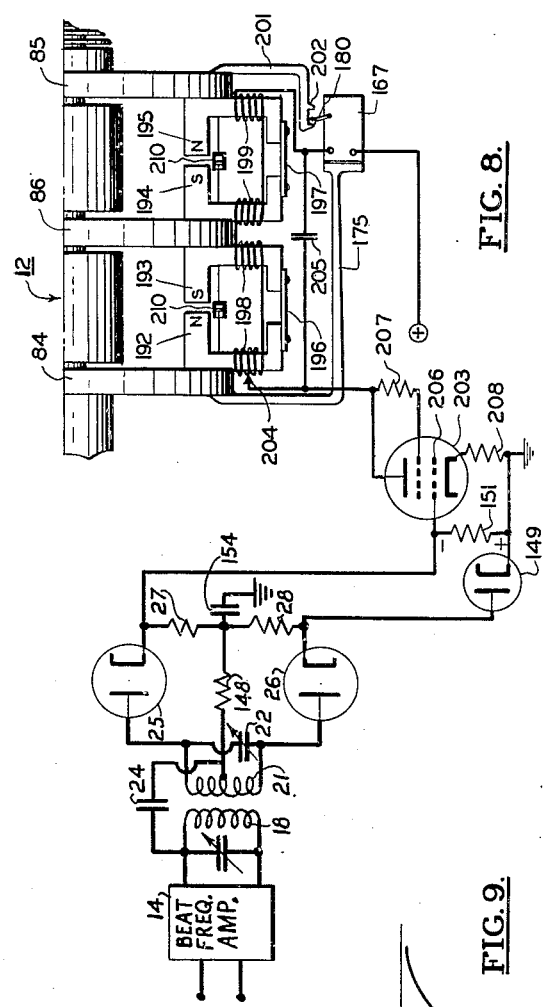
Fig. 8 is a combined wiring and diagrammatic view illustrating a further embodiment of the invention utilizing electromagnetically controlled tuning and band sweeping.

Fig. 8 illustrates a further embodiment of the invention wherein there is disclosed a cyclic tuning arrangement which is employed with part of the circuit of Fig. 4 as indicated and as a substitute for the thermal tuning devices of Fig. 4. Here, too, the parts similar to those shown in Figs. 2 or 4 are referred to by similar reference numerals.

Oscillator flanges 84 and 85 have rigidly secured thereto a pair of U-shaped soft iron pole pieces 192 and 193 having adjacent pole faces spaced by a small gap. Similar cooperating pole pieces 194 and 195 are rigidly attached to flanges 85 and 86. The outer ends of the pairs of pole pieces are secured together by flat steel spring bars 196 and 197. The respective pole pieces carry series connected windings 198 and 199 as illustrated, so that the respective adjacent oscillator flanges are interconnected by electromagnets. Spring bars 196 and 197 resist relative displacement between the associated pole pieces, so that the electromagnets are flexible and elastic.

Arm 201 and yoke 202 operate toggle switch lever 189 as in Fig. 4. Switch 167 is mounted stationary with flange 84 as illustrated. The plate circuit of a scanning control tube 203 is connected in series with the electromagnet windings and switch 167. A variable tap is provided at 204 on one of the electromagnet windings for adjusting the effective ampere turns to adjust the relative strength of the electromagnets. This provides a differential tuning adjustment for relatively tuning the resonators. A condenser 205 is preferably employed to improve the rate of response of the electromagnets to the tuning signals.

The discriminator output is connected between control grid 206 and the cathode of tube 203. The usual screen grid voltage dropping resistor is indicated at 207, and the cathode is maintained above ground potential by biasing resistor 208.

Assume that oscillator 12 starts cold with no signal from the discriminator. Since the de-energized magnet springs 196, 197 tend to force the flanges apart, the resonators of the cold oscillator are initially at lowest resonant frequency, just opposite to the situation of Fig. 4. The amplified plate current of tube 203 provides direct current energization for the electromagnets, switch 167 being closed. The opposite poles of the electromagnets attract each other, thereby moving the attached flanges to tune the oscillator over its range in one direction. At the limit of such tuning movement, yoke 202 throws switch 167 open, thereby de-energizing the electromagnets to permit separational tuning motion of the flanges under control of springs 196 and 197. If desired supplementary springs such as at 168, 169 may be used to assist this return.

Dashpots 210, effectively between the poles of the flexible electromagnets, may be provided to oppose attraction of the poles and produce a relatively slow, uniformly increasing frequency rise in oscillator 12. This is advantageous to avoid danger of running past discriminator control point B' of Fig. 9. The dashpots do not oppose separation of the poles which takes place when the magnets are de-energized, so that the time of return sweep from high to low frequency in the scanned range is relatively short and fast as compared to the opposite sweep.

The above operation is cyclic and repeatedly tunes the oscillator over its entire range. It is substantially the same as the thermal tuning arrangements except that the tuning movements are oppositely energized.

When a negative bias due to a signal from the discriminator appears on grid 206, the output of tube 203 is cut down proportionally to the signal strength. This gradually slows and stops the tuning movement, similarly to the operation of Fig. 4, and substantial balance is achieved when the output of tube 203, as opposed by the mechanical load on the electromagnets, is insufficient to cause tuning movement from a tuned condition such as point B' on Fig. 9.

Figure 9:
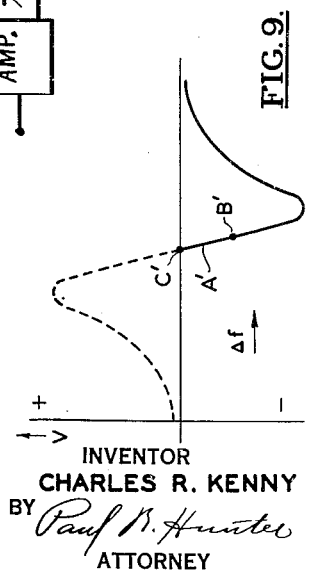
Fig. 9 is a graph illustrating the scanning operation of the apparatus of Fig. 8.

As shown in Fig. 9, the discriminator action of the circuit of Fig. 8 is opposite to that of Fig. 4, the existence of an actual difference frequency within the discriminator range being detected only when the frequency is increasing. For this reason, the discriminator output terminals when used with Fig. 8 are reversed with respect to Fig. 4, as shown by Fig. 9. Otherwise operation is substantially similar to that of Fig. 4.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Frequency control apparatus comprising a variable frequency source, frequency regulation means for said source, balanced circuit means having a differential output, means for actuating said frequency-regulation means in response to said output, means for unbalancing said circuit means to actuate said regulation means in one direction whereby said source frequency is varied in a corresponding direction, and means controlled by predetermined actuation of said regulation means for reversing the sense of unbalance produced by said unbalancing means, whereby said source frequency is varied in an opposite direction.

2. Electronic apparatus comprising variable frequency means, frequency regulating means for said variable frequency means, a balanced control circuit having a differential output for actuating said frequency regulating means, directional tuning control means for selectively unbalancing said circuit in one sense or another to produce a corresponding direction of actuation of said regulating means, and means actuating said control means by said frequency regulating means at two predetermined conditions thereof for cyclically operating said frequency regulating means so as to repeatedly scan a predetermined frequency band determined by said conditions.

3. The apparatus defined in claim 2, comprising means responsive to a frequency condition dependent on the frequency of said variable frequency means for rendering said unbalancing means inoperative and thereby halting said frequency scanning.

4. Frequency control means comprising a variable frequency source, frequency regulation means for said source, reversible motor means for actuating said frequency regulation means, a motor control circuit for said motor means, including balanced modulator means having a balanced input circuit and adapted to produce an alternating reversible-phase variable magnitude output signal corresponding in phase-sense and magnitude to the sense and magnitude of unbalance of said input circuit, a normally conducting electron discharge tube, means selectively coupling said tube to unbalance said input circuit in either sense, whereby said motor means and frequency regulation means are actuated in a corresponding sense to correspondingly vary said source frequency, and means responsive to two predetermined conditions of said regulation means for actuating said coupling means to reverse the sense of unbalance of said input circuit, whereby said source frequency is scanned between two predetermined limits corresponding to said conditions.

5. Frequency control apparatus comprising a variable frequency source, frequency regulation means for said source, reversible motor means for actuating said frequency regulating means, a motor control circuit, an electronic discharge device, switching means for periodically inserting said device into said motor circuit for oppositely energizing said circuit for repeatedly tuning said source over a predetermined frequency band, and means responsive to a frequency condition dependent on the frequency of said source for controlling the conductivity of said electron discharge device to thereby vary the effect of said tube in said circuit.

6. Frequency control apparatus for an ultra high frequency device comprising a thermally expansible tuning strut on said device, resilient means opposing expansion of said strut, a switch controlling energization of said tuning strut, and means responsive to expansion and contraction of said strut for controlling said switch for periodically energizing and de-energizing said strut to produce corresponding periodic expansion thereof.

7. Apparatus as in claim 6, further including means responsive to the frequency of said device for producing a control signal and means for controlling the energization of said strut in response to said signal to interrupt said periodic energization and maintain said frequency at a desired value.

8. Frequency control apparatus comprising a cavity resonator having spaced tuning members, an electromagnetic tuning device disposed between said members, said device being adapted when energized to effect relative displacement of said members, and resilient means forming a part of said electromagnetic means for effecting opposite relative displacement of said members.

9. Automatic frequency control apparatus comprising a variable frequency source, frequency regulation means for said source, motive means for actuating said frequency regulation means, means responsive to actuation of said frequency regulating means for controlling operation of said motive means to cause said source frequency to scan a predetermined frequency band, means providing a signal representing variation from a desired frequency condition, and means responsive to said signal for controlling said motive means to maintain said desired frequency condition and for rendering said operation controlling means inoperable to vary the frequency of said source.

10. Automatic frequency control apparatus comprising a variable frequency source, frequency-regulating means for said source, motive means for actuating said regulating means, means responsive to actuation of said regulating means for controlling operation of said motive means to cause said source frequency to scan a predetermined frequency band, means responsive to approach of said source frequency toward a desired value for producing a control signal, and means responsive to said signal for rendering said operation-controlling means inoperative to vary said source frequency and for maintaining said source frequency at said desired value.

11. Apparatus for automatically maintaining a desired frequency difference between two sources comprising means for regulating the frequency of at least one of said sources, means controlled by said regulating means for cyclically operating said frequency regulating means to scan said regulated source frequency over a predetermined frequency band, means providing a signal representing variation from said desired difference frequency, means responsive to said signal for interrupting the operation of said cyclically operating means, and further means responsive to said signal for controlling said frequency regulation means to maintain said desired frequency difference.

12. Automatic frequency control apparatus comprising means providing a signal representing variation from a desired frequency condition, frequency regulation means for said apparatus, a motor for driving said frequency regulation means, means cyclically controlling said motor for scanning a predetermined frequency band, means responsive to said signal for rendering said motor control means inoperable when said signal is of a frequency value lying between predetermined limits, and means responsive to said signal for assuming control of said limited frequency regulation means when said cyclic motor control means is inoperable to minimize said variation from the desired frequency condition.

13. Automatic frequency control apparatus comprising means providing a signal representing variation from a desired frequency condition, electromagnetic frequency regulation means for said apparatus, means for cyclically actuating said frequency regulating means for scanning a predetermined frequency band, means responsive to said signal for rendering said scanning means inoperable when said signal is of a frequency value included between predetermined limits, and means responsive to said limited signal for assuming control of said frequency regulation means to reduce said variations to a minimum when said scanning means is inoperable.

14. Automatic frequency control apparatus comprising means providing a signal representing variation from a desired frequency condition, thermally responsive frequency regulation means for said apparatus, means under the control of said frequency regulating means for cyclically actuating said frequency regulation means for scanning a predetermined frequency band, means responsive to said signal for rendering said scanning means inoperable and for assuming control of said frequency regulation means when said scanning means is inoperable.

15. Automatic frequency control apparatus comprising frequency regulation means, motor means driving said frequency regulation means, means providing a signal controlling operation of said frequency regulation means, means providing damping substantially proportional to the speed of said motor, and means responsive to said signal for modifying the damping action of said damping means.

16. Automatic volume control apparatus for a variable frequency source comprising a controllable amplifier coupled to said source, a frequency discriminator coupled to said amplifier, said discriminator comprising means for deriving a pair of voltages of the frequency of said source and varying in magnitude oppositely in response to change in frequency of said source, a pair of rectifiers for rectifying said voltages, each of said rectifiers having a respective load resistor and a load resistor common to both said rectifiers, means responsive to the difference between the voltages appearing across said respective load resistors for controlling the frequency of said source in a direction to restore said source frequency toward a desired value, and means responsive to the voltage appearing across said common load resistor for controlling the output from said amplifier.

17. Automatic volume control apparatus for a variable frequency circuit comprising a controllable amplifier coupled to said crcuit, a frequency discriminator coupled to said amplifier and comprising a tuned center-tapped circuit, a resistor connected between the center tap of said tuned circuit and ground, a rectifier and load resistor connected in series between each end of said tuned circuit and ground, means for controlling the frequency of said variable frequency circuit in response to the difference between the voltages appearing across said load resistors, and means for controlling the output of said amplifier by the voltage appearing across said first resistor.

18. Automatic frequency control apparatus comprising frequency regulation means, automatic means for actuating said frequency regulation means in response to a signal representing a version of a desired frequency condition, means for damping the actuation of said frequency regulation means, and means responsive to said signal for controlling said damping means.

19. Frequency control apparatus comprising a circuit to be controlled, a motor actuating said circuit and having a winding, means for producing an alternating current signal for controlling said circuit, means for applying said signal to said winding, means for energizing said winding by direct current, and means for controlling said direct current energization by said signal.

20. Automatic frequency control apparatus comprising a variable frequency source, motor driven tuning means for said source, a motor control circuit, means actuated by said tuning means for periodically oppositely energizing said motor control circuit for reversibly operating said motor to repeatedly tune said source over a predetermined frequency band, frequency sensitive means providing a signal representing variation from a desired frequency condition determined at least in part by said source, means for introducing said signal into said motor control circuit for energization of the latter, and means responsive to said signal for rendering said periodically energizing means inoperable when said signal is within the range of said frequency sensitive means.

21. Automatic frequency control apparatus comprising a source, electrically responsive tuning means for said source, a control circuit for said tuning means, means effective on said circuit and operated by said tuning means for cyclically operating said tuning means for repeatedly scanning a predetermined frequency band, means providing a signal representing departure from a predetermined frequency condition, and means responsive to said signal for actuating said control circuit to maintain said source frequency at said predetermined frequency condition and for simultaneously limiting energization of said control circuit to prevent actuation of said scanning means.

22. The apparatus defined in claim 21, wherein said control circuit comprises an electron discharge device, and said signal is applied to a control electrode in said device.

23. Frequency controlled apparatus comprising a variable frequency device having relatively movable frequency-adjusting members, electrically energizable force-exerting means between said members, resilient means opposing said force-exerting means, means for producing a signal for controlling said force-exerting means to vary the frequency of said device in a predetermined direction, means responsive to a predetermined frequency variation of said device for deenergizing said force-exerting means, whereby said resilient means causes said frequency to vary in an opposite direction, means responsive to a predetermined frequency variation of said device in said opposite direction for again energizing said force-exerting means to vary said frequency in said first direction, whereby said frequency is scanned periodically over a predetermined range, means for producing a signal corresponding to variation of said frequency from a desired value, and means responsive to said latter signal for limiting said first signal to a value substantially producing said desired frequency value, whereby said scanning is halted and said desired frequency value maintained.

24. Frequency control apparatus for a variable frequency device having relatively movable frequency-adjusting members comprising electrically controlled extensible means positioned between said members, means for energizing said extensible means to vary the frequency of said device in a predetermined direction, means responsive to a predetermined frequency variation of said device for deenergizing said extensible means, whereby said frequency varies in an opposite direction, means responsive to a predetermined frequency variation in said opposite direction for again energizing said extensible means to vary said frequency in said first direction, whereby said frequency is scanned periodically over a predetermined range, means for producing a signal corresponding to variation of said frequency from a desired value, and means responsive to said signal for limiting the energization of said extensible means to the value producing said desired frequency value, whereby said scanning is halted and said desired frequency value is maintained.

25. Frequency control apparatus comprising a variable frequency source having frequency regulation means, frequency discriminator means responsive to the output of said source and adapted to produce a discriminator output signal corresponding in sense and magnitude to the direction and magnitude of deviation of said source frequency from a desired value, a source of power frequency energy, modulator means coupled to said power frequency source and responsive to said discriminator output signal for producing an alternating output signal of said power frequency having magnitude and phase-sense respectively corresponding to the magnitude and sense of said discriminator output signal, reversible motive means for said regulation means coupled to said modulator means and adapted to adjust said regulating means in a direction corresponding to the phase-sense of said power frequency signal and in a direction to restore said source frequency toward said desired value, means for causing said modulator means to produce an output to actuate said motive means independently of said discriminator output signal, and means responsive to an input signal to said discriminator means for rendering said last-named means inoperative.

26. Frequency control apparatus comprising a variable frequency source having frequency regulation means, frequency discriminator means responsive to the output of said source and adapted to produce a discriminator output signal corresponding in sense and magnitude to the direction and magnitude of deviation of said source frequency from a desired value, a source of power frequency energy, modulator means coupled to said power frequency source and responsive to said discriminator output signal for producing an alternating output signal of said power frequency having magnitude and phase-sense respectively corresponding to magnitude and sense of said discriminator output signal, reversible motive means for said regulation means coupled to said modulator means and adapted to adjust said regulating means in a direction corresponding to the phase-sense of said power frequency signal and in a direction to restore said source frequency toward said desired value, said modulator means comprising a balanced circuit and further including means for unbalancing said circuit whereby said motive means will be actuated independently of said discriminator output signal and means responsive to rotation of said motive means beyond a predetermined limit in either direction for reversing the sense of said unbalance, whereby said motive means will thereby actuate said frequency regulation means to vary said source frequency in a reverse direction, and means responsive to an input signal to said discriminator means for rendering said unbalancing means inoperative.

27. Frequency control apparatus comprising a variable frequency source, frequency regulation means for said source, reversible motive means coupled to said regulation means for actuating said regulation means to vary said source frequency, balanced circuit means coupled to said motive means to actuate said motive means in a sense corresponding to the differential output of said balanced circuit means, means for unbalancing said circuit means, whereby said motive means is actuated in a corresponding sense, and means responsive to attaining either of a pair of predetermined positions of said frequency regulation means for reversing the sense of said unbalance to vary said source frequency in an opposite direction, whereby said source frequency is cyclically varied between two limits determined by said two positions of said frequency regulating means.

28. Apparatus as in claim 27, further including means responsive to a source frequency value in the neighborhood of a desired value for rendering said unbalancing means inoperative, whereby the cyclic scanning of said motive means is interrupted.

29. Apparatus as in claim 27, further including means responsive to a source frequency value in the neighborhood of a desired value for rendering said unbalancing means inoperative, whereby the cyclic scanning of said motive means is interrupted, and further including means for producing a control signal corresponding in sense and magnitude to the sense and magnitude of deviation of said source frequency from said desired value, and means for actuating said balanced circuit means by said control signal to produce a corresponding motive means control signal adapted to actuate said motive means to vary said source frequency towards said desired value.

CHARLES R. KENNY.

REFERENCES CITED

The following references are of record in the file of this patent:

UNITED STATES PATENTS

| Number | Name | Date |
| --- | --- | --- |
| 1,855,152 | Jones | Apr. 19, 1932 |
| 1,934,400 | Bollman | Nov. 7, 1933 |
| 2,012,603 | Fuchs | Aug. 27, 1935 |
| 2,041,855 | Ohl | May 26, 1936 |
| 2,151,127 | Logan | Mar. 21, 1939 |
| 2,173,902 | Gerth | Sept. 26, 1939 |
| 2,190,319 | Koch | Feb. 13, 1940 |
| 2,196,402 | Snyder | Apr. 9, 1940 |
| 2,210,781 | Shofstall | Aug. 6, 1940 |
| 2,227,467 | Sweeny | Jan. 7, 1941 |
| 2,285,016 | Carlisle | June 2, 1942 |
| 2,287,925 | White | June 30, 1942 |
| 2,311,658 | Hansen | Feb. 23, 1943 |
| 2,326,737 | Andrews | Aug. 17, 1943 |
| 2,380,947 | Crosby | Aug. 7, 1945 |

Certificate of Correction

Patent No. 2,452,575.

November 2, 1948.

CHARLES R. KENNY

It is hereby certified that errors appear in the printed specification of the above numbered patent requiring correction as follows:

Column 6, line 46, for "ocsillator" read *oscillator*; column 9, line 31, for the word "arrange" read *range*; column 18, line 75, claim 12, after "said" strike out "limited" and insert the same after "said" line 74, same claim;

and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*